(12) United States Patent
Yang et al.

(10) Patent No.: US 10,688,595 B2
(45) Date of Patent: Jun. 23, 2020

(54) LASER WELDING OVERLAPPING METAL WORKPIECES

(71) Applicant: GM GLOBAL TECHNOLOGY OPERATIONS LLC, Detroit, MI (US)

(72) Inventors: David S. Yang, Shanghai (CN); Justin Allen Wolsker, Shelby Township, MI (US); Jing Zhang, Shanghai (CN); Wu Tao, Shanghai (CN); Dalong Gao, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 324 days.

(21) Appl. No.: 15/575,170

(22) PCT Filed: Jun. 2, 2015

(86) PCT No.: PCT/CN2015/080578
§ 371 (c)(1),
(2) Date: Nov. 17, 2017

(87) PCT Pub. No.: WO2016/192039
PCT Pub. Date: Dec. 8, 2016

(65) Prior Publication Data
US 2018/0141158 A1 May 24, 2018

(51) Int. Cl.
*B23K 26/244* (2014.01)
*B23K 101/34* (2006.01)
(Continued)

(52) U.S. Cl.
CPC ........ *B23K 26/244* (2015.10); *B23K 2101/34* (2018.08); *B23K 2103/04* (2018.08); *B23K 2103/08* (2018.08)

(58) Field of Classification Search
CPC ..... B23K 26/244; B23K 26/21; B23K 26/206
(Continued)

(56) References Cited

U.S. PATENT DOCUMENTS

2006/0278618 A1* 12/2006 Forrest ............... B23K 26/0604
219/121.64
2008/0302768 A1* 12/2008 Mazumder ........... B23K 26/244
219/121.64

FOREIGN PATENT DOCUMENTS

CN 103100795 A 5/2013
CN 103831531 A 6/2014
(Continued)

OTHER PUBLICATIONS

Search Report and Written Opinion for application No. PCT/CN2015/080578, dated Mar. 15, 2016; 11 pages.

*Primary Examiner* — Lauren A Crane
(74) *Attorney, Agent, or Firm* — Reising Ethington P.C.

(57) ABSTRACT

A method of laser welding a workpiece stack-up (10) that includes at least two overlapping steel workpieces (12, 14) comprises directing a laser beam (40) at a top surface (26) of the workpiece stack-up to form a keyhole (56) surrounded by a molten steel weld pool (58). The laser beam is conveyed along a predefined weld pattern that includes one or more nonlinear inner weld paths (66) and an enclosed outer peripheral weld path (68) surrounding the one or more nonlinear inner weld paths. During conveyance of the laser beam along the one or more nonlinear inner weld paths, the keyhole fully penetrates through the workpiece stack-up from the top surface of the stack-up to the bottom surface (28) of the stack-up. The method produces weld joints between the steel workpieces that do not have an intentionally imposed gap formed between their faying surfaces.

20 Claims, 5 Drawing Sheets

(51) Int. Cl.
 *B23K 103/04* (2006.01)
 *B23K 103/08* (2006.01)
(58) Field of Classification Search
 USPC .......................................... 219/121.64, 121.6
 See application file for complete search history.

(56) References Cited

FOREIGN PATENT DOCUMENTS

| | | |
|---|---|---|
| JP | 2011140053 A | 7/2011 |
| JP | 2012091178 A | 5/2012 |

* cited by examiner

LASER WELDING OVERLAPPING METAL WORKPIECES

TECHNICAL FIELD

The technical field of this disclosure relates generally to laser welding and, more particularly, to remote laser welding of overlapping steel workpieces.

BACKGROUND

Laser welding is a metal joining process in which a laser beam is directed at a metal workpiece stack-up to provide a concentrated heat source capable of effectuating a weld joint between the component metal workpieces. In general, two or more metal workpieces are first aligned and stacked relative to one another such that their faying surfaces overlap and confront at an intended welding site. A laser beam is then directed at a top surface of the workpiece stack-up. The heat generated from the absorption of energy from the laser beam initiates melting of the metal workpieces and establishes a molten weld pool within the workpiece stack-up. The molten weld pool penetrates through the metal workpiece impinged upon by the laser beam and into the underlying metal workpiece or workpieces. When the laser beam has a high enough power density, a keyhole is created within the molten weld pool directly underneath the laser beam (a process known as "keyhole welding"). A keyhole is a column of vaporized metal derived from the metal workpieces within the workpiece stack-up that may include plasma.

The keyhole provides a conduit for energy absorption deeper into workpiece stack-up which, in turn, facilitates deeper penetration of the molten weld pool and a narrower weld pool profile. As such, the keyhole is normally controlled to penetrate into the workpiece stack-up across each faying interface, but only partially through the bottommost metal workpiece. The keyhole is typically created in very short order—typically miliseconds—once the laser beam impinges the top surface of the workpiece stack-up. After the keyhole is formed and stable, the laser beam is moved a short distance along a weld path. Such movement of the laser beam leaves behind molten workpiece material in the wake of the corresponding travel path of the keyhole and molten weld pool. This penetrating molten workpiece material cools and solidifies in the same direction as the forward movement of the laser beam to provide a trail of re-solidified workpiece material that fusion welds the workpieces together.

The automotive industry frequently uses remote laser welding to join metal sub-assemblies into finished parts that can be installed on a vehicle. In one example, a vehicle door body may be fabricated from an inner door panel and an outer door panel that are joined together by a plurality of laser welds. The inner and outer door panels are first stacked relative to each other and typically secured in place by clamps. A moveable optic laser head then intermittently directs a laser beam at multiple weld sites around the stacked panels in accordance with a programmed sequence to form the plurality of laser welds. At each weld site where a laser weld is to be formed, the laser beam is directed at the stacked panels and conveyed along a predefined weld path, which may be configured to produce a discrete spot weld or a continuous seam weld. The process of laser welding inner and outer door panels (as well as other vehicle part components such as those used to fabricate hoods, deck lids, etc.) is typically an automated process that can be carried out quickly and efficiently.

The use of remote laser welding to join coated metal workpieces together can present challenges. For example, zinc-coated steel workpieces include a thin outer coating of zinc for corrosion protection. Zinc has a boiling point of about 906° C., while the melting point of the base steel substrate it coats is typically greater than 1300° C. Thus, when zinc-coated steel workpieces are laser welded together, high-pressure zinc vapor is readily produced at the surfaces of the steel workpieces. The zinc vapor produced at the faying surfaces of the stacked steel workpieces is forced to diffuse into and through the molten weld pool produced by the laser beam unless an alternative escape outlet is provided through the workpiece stack-up. When an adequate escape outlet is not provided, zinc vapors may remain trapped in the molten weld pool as it cools and solidifies, which may lead to defects in the resulting weld joint—such as spatter and porosity—that degrade the mechanical properties of the joint to such an extent that the joint may be deemed non-confirming. The vaporization of zinc coatings on steel workpiece surfaces during laser welding has the tendency to be most disruptive when the faying surfaces of the steel workpieces are tightly fit with a zero-gap interface therebetween.

To deter zinc vapor from diffusing into the molten weld pool, and ultimately causing weld defects to be present in the re-solidified workpiece material of a weld joint formed between steel workpieces (at least one of which is zinc-coated), the workpieces are oftentimes scored with a laser beam before laser welding takes place to create spaced apart protruding features on one or more of the faying surfaces of the steel workpieces. The protruding features impose a gap of about 0.1-0.2 millimeters between the faying surfaces of the steel workpieces, which provides an escape path to guide zinc vapors away from the weld site during the laser welding process. But the formation of these protruding features adds an additional step to the overall remote laser welding process and tends to produce undercut weld joints that, while acceptable, are not as desirable as weld joints that are formed between steel workpieces that do not have an intentionally imposed gap formed between their faying surfaces to facilitate vapor escape.

SUMMARY OF THE DISCLOSURE

A method of remote laser welding a workpiece stack-up that includes two or more overlapping steel workpieces is disclosed in which at least one of the workpieces is coated with a layer of zinc that has a boiling point, and thus vaporizes, at a temperature below the melting point of each of the steel workpieces in the workpiece stack-up. Prior to welding, the steel workpieces are assembled in overlapping fashion such that a zero-gap interface is formed between their faying surfaces. For example, in one embodiment, the workpiece stack-up may include first and second steel workpieces having first and second faying surfaces, respectively, that confront and abut one another to provide a single zero-gap faying interface between their contacting faying surfaces. In another embodiment, the workpiece stack-up may include an additional third steel workpiece situated between the first and second steel workpieces. In such case, the first and second steel workpieces have first and second faying surfaces, respectively, that confront and abut opposed faying surfaces of the third steel workpiece such that two zero-gap faying interfaces are formed between the contacting faying surfaces of the first, second, and third steel workpieces. When a third steel workpiece is present, the first and second steel workpieces may consist of separate and distinct parts or, alternatively, they may represent different portions of the same part, such as when an edge of one part is folded back over on itself and hemmed over a free edge of another part.

The steel workpieces in the workpiece stack-up are joined together using a remote laser welding process in which a laser beam is directed at a top surface of the workpiece stack-up at a weld site. The laser beam has a power density sufficient to form a keyhole surrounded by a molten steel weld pool in the workpiece stack-up. The keyhole extends from the top surface of the workpiece stack-up toward a bottom surface thereof. The molten steel weld pool surrounds but does not collapse into the keyhole due to the vapor pressure of the keyhole acting upon and pushing against the surrounding weld pool. After the keyhole is formed, the laser beam is moved along the top surface of the workpiece stack-up in accordance with a predefined weld pattern. As the laser beam tracks the predefined weld pattern, it leaves behind molten workpiece material in the wake of the corresponding travel path of the advancing laser beam and keyhole. This molten workpiece material quickly cools and solidifies into a trail of re-solidified workpiece material, which is surrounded within the workpiece-stack up by a heat-affected zone, that fusion welds the steel workpieces together. When the laser beam has finished tracking the predefined weld pattern, a completed fusion laser weld joint is produced at the weld site of the workpiece stack-up. Thereafter, the laser beam is removed from the top surface of the workpiece stack-up.

The weld pattern tracked by the laser beam includes one or more nonlinear inner weld paths enclosed by an outer peripheral weld path. The one or more nonlinear inner weld paths are spaced and contoured so that the heat affected zone surrounding the trail of re-solidified workpiece material formed along each of the one or more nonlinear inner weld paths overlaps with the heat-affected zone of the trail of re-solidified workpiece material formed along at least one other inner weld path or at least one adjacent portion of the same inner weld path. For example, the one or more nonlinear inner weld paths may comprise a plurality of radially spaced and unconnected circular inner weld paths (such as a series of concentric circular inner weld paths). In this case, after the plurality of circular inner weld paths are traced by the laser beam, each of the resultant circles of re-solidified workpiece material has a heat-affected zone that overlaps with a heat-affected zone of at least one other circle of re-solidified workpiece material. As another example, the one or more nonlinear inner weld paths may comprise a spiral inner weld path that revolves around and expands radially outwardly from a fixed interior point. In this case, after the spiral inner weld path is traced by the laser beam, each of the resultant revolutions of re-solidified workpiece material within the spiral shape has a heat-affected zone that overlaps with at least one adjacent revolution of re-solidified workpiece material. The one or more nonlinear inner weld paths may, of course, assume a variety of other spatial arrangements in addition to circles and spirals.

The enclosed outer peripheral weld path surrounds the one or more nonlinear inner weld paths and generally defines an outer periphery of the weld pattern. The enclosed outer peripheral weld path may be a circle, an oval, an epicycloid, an epitrochoid, or a hypocycloid, among other options, and it preferably has a diameter that ranges from 4 mm to 15 mm as measured between the two points on the outer peripheral weld path that are separated from each other by the greatest distance that intersects the center of the outer peripheral weld path. While the enclosed outer peripheral weld path is preferably closed entirely, it does not necessarily have to be. For example, the outer peripheral weld path may include intermittent interruptions or may stop just short of full enclosure. Still further, the enclosed outer peripheral weld path may be interconnected with the one or more nonlinear inner weld paths or it may be a discrete weld path that is spaced-apart and distinct from the one or more nonlinear inner weld paths. A spiral inner weld path, for example, may seamlessly transition into the outer peripheral weld path, while, as another example, a plurality of radially spaced inner circular weld paths may be unconnected and thus distinct from the outer peripheral weld path, among other possibilities.

The penetration of the keyhole is controlled as the laser beam is conveyed along the weld pattern. As the laser beam follows the one or more nonlinear inner weld paths, the keyhole fully penetrates the workpiece stack-up; that is, the keyhole extends from the top surface of the workpiece stack-up through the bottom surface of the stack-up and penetrates through each overlapping steel workpiece within the stack-up. Conversely, as the laser beam follows the enclosed outer peripheral weld path, the keyhole does not fully penetrate through the workpiece stack-up; rather, the keyhole partially penetrates into the workpiece stack-up such that it extends into the stack-up from the top surface but does not reach the bottom surface. The partially-penetrating keyhole may penetrate far enough into the stack-up that the keyhole at least traverses the faying interface(s) between the overlapping steel workpieces in order to continue yielding a trail of re-solidified workpiece material that fusion welds the workpieces together, although such depth of keyhole penetration is not mandatory on all occasions. The power level, velocity, and/or focal position of the laser beam may be controlled during the laser welding process so that the keyhole penetrates the workpiece stack-up at the desired depth over the course of conveying the laser beam along the weld pattern.

The movement of the fully penetrating keyhole during conveyance of the laser beam along the one or more nonlinear inner weld paths is believed to efficiently and effectively vent zinc vapor through the keyhole and away from the zero-gap faying interface(s) within the workpiece stack-up. Indeed, the overlapping heat-affected zones attributed to the spacing and contour of the one or more nonlinear inner weld paths are believed to be responsible for aiding zinc vapor escape through the keyhole. Ultimately, the extraction and removal of zinc vapor away from the faying interface(s) minimizes or altogether eliminates the diffusion and trapping of zinc vapor within the trail of re-solidified workpiece material that is formed in the wake of the laser beam as it moves along the one or more nonlinear inner weld paths. Moreover, the movement of the partially penetrating keyhole during conveyance of the laser beam along the enclosed outer peripheral weld path creates a smoother transition on the top surface of the workpiece stack-up between the laser weld joint and the adjacent surrounding portions of the stack-up. This avoids the formation of a sharp crest on the top surface at the boundary of the laser weld joint that can weaken the joint, promote burn-through, and adversely affect the visible appearance of the weld joint.

The inner and outer weld paths of the weld pattern may be tracked by the laser beam in any desired sequence. The one or more nonlinear inner weld paths may be tracked first, followed by the enclosed outer peripheral weld path. Or, alternatively, the enclosed outer peripheral weld path may be tracked first, followed by the one or more nonlinear inner weld paths. Additionally, the one or more nonlinear inner weld paths themselves may be tracked by the laser beam in a variety of ways. For example, if the weld pattern includes a plurality of radially-spaced and unconnected circular inner weld paths surrounded by a circular outer peripheral weld path, the laser beam may start by tracking the innermost circular inner weld path (one of the nonlinear inner weld paths) and then continue tracking successively larger circular paths (the rest of the nonlinear inner weld paths) until it tracks the outermost circular weld path (the enclosed outer peripheral weld path). Alternatively, the laser beam may proceed from the outermost circular path to the innermost circular path, or it may proceed by tracking the several discrete circular paths in some other sequence. Similarly, if the weld pattern includes a spiral inner weld path that connects with a circular outer peripheral weld path, the laser beam may start at the fixed interior point of the spiral inner weld path and revolve around and away from that point until it transitions into the circular outer peripheral weld path, or it may start with the circular outer peripheral weld path and revolve around and towards the fixed interior point of the spiral until it completes tracking the spiral inner weld path.

DETAILED DESCRIPTION

Figure 1:
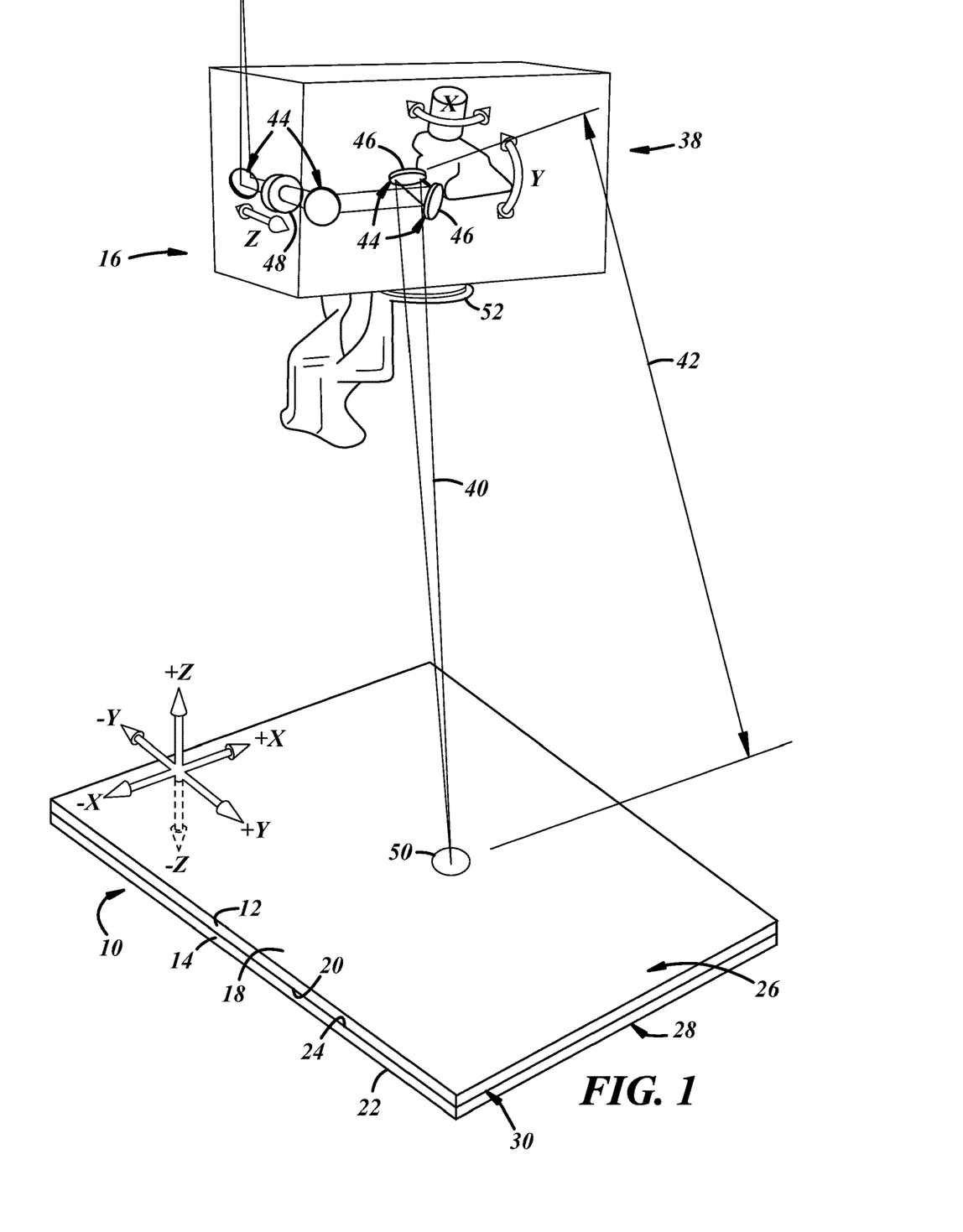
FIG. 1 is a perspective view of an embodiment of a remote laser welding apparatus for producing a laser weld joint within a workpiece stack-up that includes overlapping steel workpieces.
Figure 2:
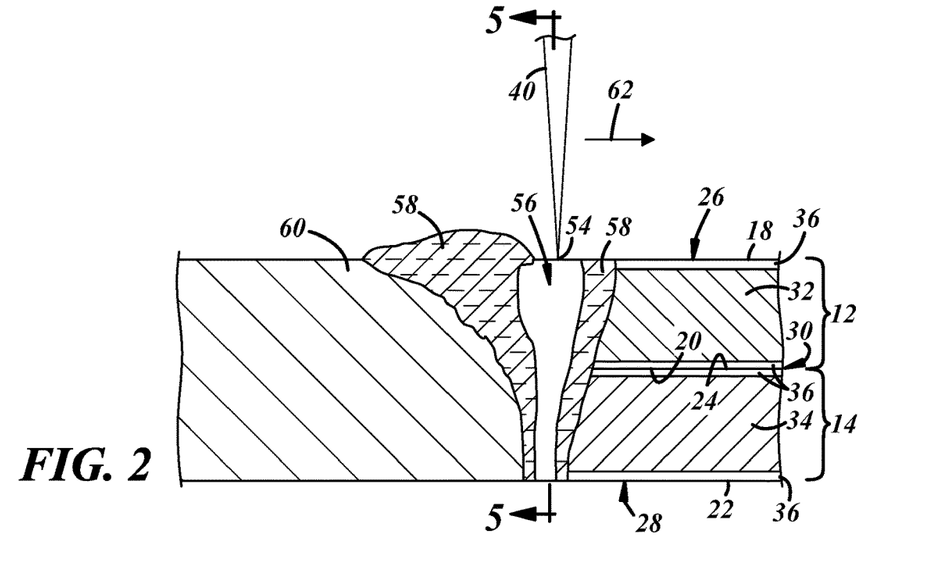
FIG. 2 is a cross-sectional view of a keyhole formed in a workpiece stack-up by a laser beam.
Figure 3:
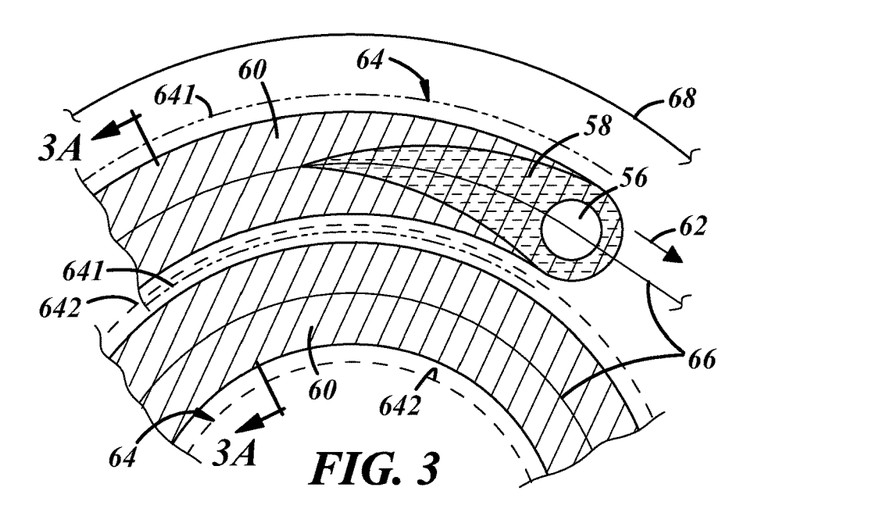
FIG. 3 is a top view of the keyhole and the workpiece stack-up illustrated in FIG. 2.

A method of remote laser welding a workpiece stack-up 10 that includes a first steel workpiece 12 and a second steel workpiece 14 using a remote laser welding apparatus 16 is shown in FIGS. 1-3. The first steel workpiece 12 includes an outer surface 18 and an opposing first faying surface 20, and the second steel workpiece 14 includes an outer surface 22 and an opposing second faying surface 24. Relative to the position of the remote laser welding apparatus 16, the outer surface 18 of the first steel workpiece 12 provides a top surface 26 of the workpiece stack-up 10 and the outer surface 22 of the second steel workpiece 14 provides an oppositely-facing bottom surface 28 of workpiece stack-up 10. Conversely, since they are the only two steel workpieces depicted in the stack-up 10, the first and second faying surfaces 20, 24 of the first and second steel workpieces 12, 14 overlap and abut to provide a faying interface 30 at a weld site. The overlapping abutment of the faying surfaces 20, 24 is generally complimentary along the faying interface 30 at the weld site, thus providing a zero-gap interface in which the faying surfaces 20, 24 closely confront each other and are not purposefully separated by any gaps or spaces imposed by intentionally formed protruding features. The term "zero-gap interface" encompasses flush abutting contact between the faying surfaces 20, 24 as well as instances in which the faying surfaces 20, 24 are separated by distances of no more than 80 μm as a result of acceptable tolerances in the size and shape of the workpieces 12, 14 or otherwise.

The first and second steel workpieces 12, 14 include first and second steel substrates 32, 34, respectively. The steel substrates 32, 34 may be composed of any of a wide variety of steels including a low carbon steel (also referred to as mild steel), an interstitial-free (IF) steel, a high-strength low-alloy (HSLA) steel, or an advanced high strength steel (AHSS) such as dual phase (DP) steel, transformation-induced plasticity (TRIP) steel, twinning-induced plasticity (TWIP) steel, complex-phase (CP) steel, martensitic (MART) steel, hot-formed (HF) steel, and press-hardened (PHS) steel. At least one, and preferably both, of the first or second steel workpieces 12, 14 is zinc-coated. A zinc-coated steel workpiece includes a layer of zinc 36 on at least one of its major surfaces. Indeed, as shown in FIG. 2, each side of the first and second steel substrates 32, 34 is coated with a layer of zinc 36 that, in turn, provides the workpieces 12, 14 with their outer surface 18, 22 and their faying surface 20, 24. These zinc layers 36 may be applied by hot-dip galvanizing, electro-galvanizing, or galvannealing, for example, and are typically 2 μm to 16 μm thick. Taking into account the thickness of both the steel substrate 32, 34 and the zinc layers 36, the first and second steel workpieces 12, 14 may have thicknesses in the range of 0.5 mm to 2.0 mm, at least at the weld site, and their thicknesses may be the same as or different from each other.

FIGS. 1-3 illustrate an embodiment of the remote laser welding method in which the workpiece stack-up 10 includes two overlapping steel workpieces 12, 14 that have a single zero-gap faying interface 30. Of course, as previously indicated, the workpiece stack-up 10 may include an additional third steel workpiece (not shown) situated between the first and second steel workpieces 12, 14, despite not being explicitly shown in the drawings. The third steel workpiece can have the same properties and characteristics (e.g., composition, thickness, coatings, etc.) as the first and second steel workpieces 12, 14 described above. When the additional third steel workpiece is present in the stack-up 10, the first and second faying surfaces 20, 24 of the first and second steel workpieces 12, 14 overlap with and abut opposed faying surfaces of the third steel workpiece to establish two zero-gap faying interfaces. Skilled artisans will know and appreciate that the remote laser welding method, including the following disclosure directed to a workpiece stack-up that includes two steel workpieces, can be readily adapted and applied to workpiece stack-ups that include three overlapping steel workpieces without undue difficulty.

As shown in FIG. 1, the remote laser welding apparatus 16 includes a scanning optic laser head 38. The scanning optic laser head 38 focuses and directs a laser beam 40—typically a near infrared fiber-delivered solid-state laser beam-toward the top surface 26 of the workpiece stack-up 10 which, here, is provided by the outer surface 18 of the first steel workpiece 12. The scanning optic laser head 38 is preferably mounted to a robotic arm (not shown) that can quickly and accurately carry the laser head 38 to the different preselected weld sites on the workpiece stack-up 10. The laser beam 40 may be maintained at a longitudinal distance 42 of about 0.4 meters to about 1.5 meters above the top surface 26 of the workpiece stack-up 10 (outer surface 18) and may have a focal point diameter in the range of 350 μm to 700 μm.

The scanning optic laser head 38 includes an arrangement of mirrors 44 that maneuver the laser beam 40 within a three-dimensional process envelope. The arrangement of mirrors 44 includes a pair of tiltable scanning mirrors 46. Each of the tiltable scanning mirrors 46 is mounted on a galvanometer. The two tiltable mirrors 46 can move the laser beam 40 in the x-y plane of the operating envelope by coordinating their movements. In addition to the tiltable scanning mirrors 46, the laser head 38 also includes a z-axis focal lens 48, which can move a focal point of the laser beam 40 in the z-direction. All of these components 46, 48 can be rapidly indexed in a matter of milliseconds to focus and direct the laser beam 40 precisely as intended at the workpiece stack-up 10 to form a laser weld joint 50 (shown from the top in FIG. 1) that autogenously fusion welds the first and second steel workpieces 12, 14 together. And, to keep dirt and debris from adversely affecting the optical system and ultimately the weld joint 50, a cover slide 52 may be situated below the scanning optic laser head 38. The cover slide 52 protects the tiltable mirrors 46 and the z-axis focal lens 48 from the environment yet allows the laser beam 40 to pass out of the laser head 38. Many kinds of commercially available scanning optic laser heads may be used in combination with the remote laser welding apparatus 16 including, for example, a RLSK (remote laser processing head) from HIGHYAG (headquartered in Kleinmachnow, Germany).

The weld joint 50 is formed between the first and second steel workpieces 12, 14 by conveying the laser beam 40 along a predefined weld pattern relative to the top surface 26 of the workpiece stack-up 10. As shown best in FIG. 2, the laser beam 40, which includes a focal point 54 (position controllable by the z-focus lens 48), is directed at the top surface 26 of the workpiece stack-up 10 at the weld site. The heat generated from absorption of the focused energy of the laser beam 40 causes the first and second steel workpieces 12, 14 to vaporize in the immediate vicinity of the laser beam 40 to create a keyhole 56. Absorbed heat from the laser beam 40 also induces lateral melting of the first and second steel workpieces 12, 14 outward and around the keyhole 56 to establish a molten steel weld pool 58 that surrounds the keyhole 56.

Figure 3A:
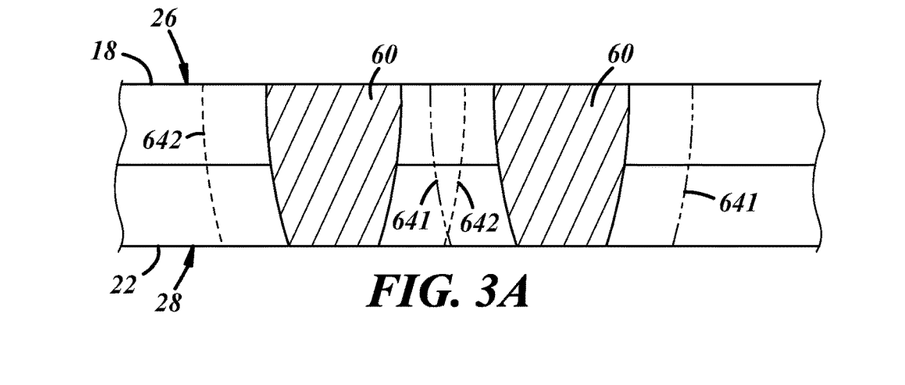
FIG. 3A is a cross-sectional view taken along lines 3A-3A in FIG. 3.

After formation of the keyhole 56 and its surrounding molten steel weld pool 58, the laser beam 40 and the keyhole 56 are conveyed along the predefined weld pattern at the weld site. As the laser beam 40 and the keyhole 56 track the predefined weld pattern, the molten steel weld pool 58 follows and leaves behind molten workpiece material in the wake of the advancing laser beam 40 and corresponding keyhole 56. This molten workpiece material quickly cools and solidifies into a trail of re-solidified workpiece material 60 that fusion welds the first and second steel workpieces 12, 14 together. Arrow 62 in FIGS. 2 and 3 indicates the instantaneous direction of travel of the laser beam 40 and the keyhole 56. Additionally, as is also shown in FIGS. 3-3A, the heat generated by the laser beam 40 affects more than just the portions of the first and second steel workpieces 12, 14 that are vaporized into, or melted around, the keyhole 56. In fact, as a result of the molten workpiece material being created by the laser beam 40 and then solidified, the trail of re-solidified workpiece material 60 is surrounded within the workpiece stack-up 10 by a heat-affected zone 64. The heat affected zone 64 is an area in the workpiece stack-up 10 that is not melted by the laser beam 40 but is nonetheless heated and cooled as the laser beam 40 passes by to permanently alter the microstructure of the first and second steel workpieces 12, 14 in that area.

The configuration of the predefined weld pattern tracked by the laser beam 40 enables the weld joint 50 to successfully fuse the first and second steel workpieces 12, 14 together with a zero-gap faying interface 30 between their faying surfaces 20, 24 at the weld site. The weld pattern may take on a variety of different configurations, but, in general, as shown best in FIG. 3, includes one or more nonlinear inner weld paths 66 and an enclosed outer peripheral weld path 68 that surrounds the one or more nonlinear inner weld paths 66. As the laser beam 40 tracks the inner weld path(s) 66 of the weld pattern, the heat-affected zone 64 that surrounds the trail of re-solidified workpiece material 60 formed along each of the one or more nonlinear inner weld paths 66 overlaps with the heat-affected zone 64 associated with the same or different inner weld path 66 to ultimately minimize zinc vapor diffusion and entrapment within the molten steel weld pool 58, as will be further explained below.

The one or more nonlinear inner weld paths 66 are spaced and contoured so that, after the laser beam 40 tracks the nonlinear inner weld path(s) 66, the heat affected zone 64 surrounding the trail of re-solidified workpiece material 60 formed along each of the one or more nonlinear inner weld paths 66 overlaps with the heat-affected zone 64 of the trail of re-solidified workpiece material 60 formed along at least one other inner weld path 66 or at least one adjacent portion of the same inner weld path 66. For instance, FIG. 3 partially depicts two adjacent nonlinear inner weld paths 66 or two adjacent portions of the same nonlinear inner weld path 66 surrounded by the enclosed outer peripheral weld path 68. As shown, the laser beam 40, which is now traveling along the upper inner weld path or upper inner weld path portion, has already been conveyed along the lower inner weld path or lower inner weld path portion. The heat-affected zone 64 that surrounds the trail of re-solidified workpiece material 60 being formed along the upper inner weld path or weld path portion is denoted with reference numeral 641 and the heat-affected zone 64 that surrounds the trail of re-solidified workpiece material 60 that has already been formed along the lower inner weld path or weld path portion is denoted with reference numeral 642. The heat-affected zones 641, 642 associated with the two inner weld paths or inner weld path portions overlap as shown in both FIGS. 3 and 3A.

The enclosed outer weld path 68 generally defines an outer periphery of the weld pattern and preferably has a diameter that ranges from 4 mm to 15 mm as measured between the two points on the outer peripheral weld path 68 that are separated from each other by the greatest distance that intersects the center of the outer peripheral weld path 68. While the enclosed outer peripheral weld path 68 is preferably a closed circle or a closed oval, it does not necessarily have to be either one of those geometric shapes, nor does it have to be closed in every instance. Moreover, the enclosed outer peripheral weld path 68 may be interconnected with the one or more nonlinear inner weld paths 66 (see FIGS. 4A-4F) or it may be spaced-apart and distinct from the one or more nonlinear inner weld paths 66 (see FIGS. 4G-4N).

When the laser beam 40 tracks the enclosed outer peripheral weld path 68, the heat-affected zone 64 that surrounds the resultant trail of re-solidified workpiece material 60 may overlap with the heat-affected zone(s) 64 surrounding the trail(s) of re-solidified workpiece material 60 that are formed along the one or more nonlinear inner weld paths 66, but it is not required to do so. This is because the trail of re-solidified workpiece material 60 formed along the enclosed outer peripheral weld path 68 is meant primarily to provide a smoother transition between the weld joint 50 and the surrounding area of the workpiece stack-up 10 with a secondary objective being to fuse the first and second steel workpieces 12, 14 together. For this reason, the trail of re-solidified workpiece material 60 formed along the enclosed outer peripheral weld path 68 may, but does not necessarily have to, traverse the faying interface 30 and extend into the second steel workpiece 14.

Figure 4A:
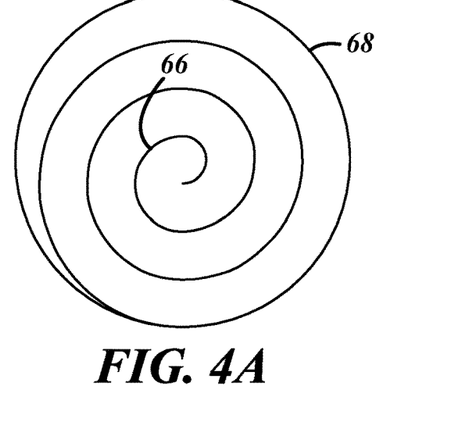
FIGS. 4A through 4N depict a variety of exemplary weld patterns as projected on the top surface of the workpiece stack-up that may be tracked by a laser beam, and thus a keyhole and surrounding molten steel weld pool, during formation of a laser weld joint between overlapping steel workpieces.

The predefined weld pattern can take on a wide variety of different geometric configurations. Referring now generally to FIGS. 4A through 4N, which are plan views of the weld pattern as projected in the x-y plane of the top surface 26 of the workpiece stack-up 10, the predefined weld pattern may comprise a closed-curve pattern, a spiral pattern, a roulette pattern, or a combination thereof. A closed-curve pattern may be any pattern that includes a plurality of radially-spaced and unconnected circular weld paths, elliptical weld paths, or weld paths having like closed curves, with a preferred number of such closed curves ranging from three to eight. A spiral pattern may be any pattern having a single weld path that emanates from a fixed interior point and expands radially outwardly from the interior point as the weld path revolves around the interior point. The fixed interior point can be located at or near the center of the weld pattern, or may be offset from the center of the weld pattern. A roulette pattern may be any pattern that includes an epicycloid weld path, an epitrochoid weld path, and/or a hypocycloid weld path, among other options. FIGS. 4A through 4N illustrate various examples of these types of weld patterns including their identified nonlinear inner weld path(s) 66 and enclosed outer peripheral weld path 68.

Figure 4B:
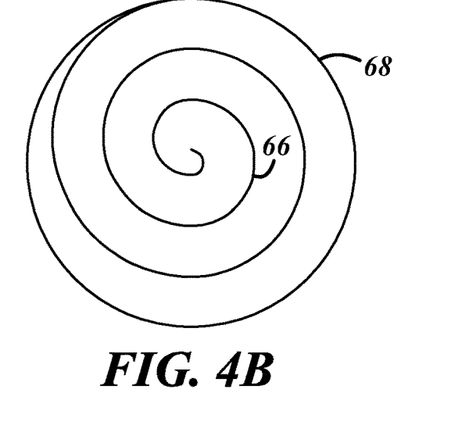
Figure 4C:
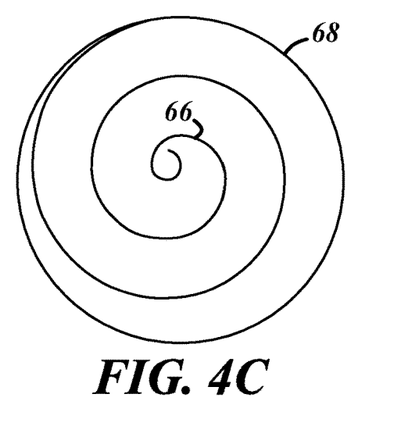
Figure 4D:
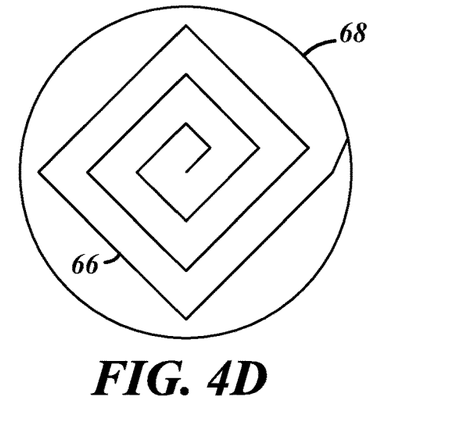
Figure 4E:
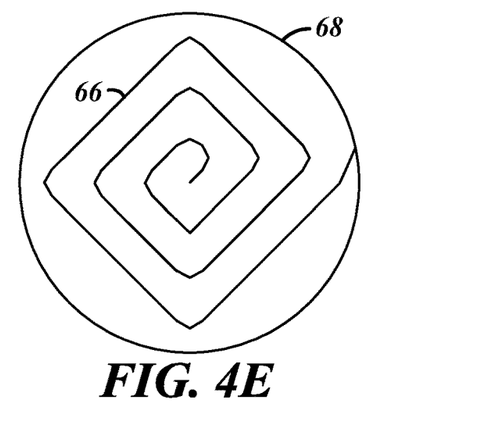

Each of the weld patterns shown in FIGS. 4A-4E comprises a single nonlinear inner weld path 66 surrounded by, and interconnected with, an enclosed outer peripheral weld path 68. Specifically, each of the weld patterns shown in FIGS. 4A-4E has a spiral inner weld path 66 and a circular outer peripheral weld path 68. The spiral inner weld path 66 revolves around and expands radially outwardly from a fixed interior point of the weld pattern until it transitions into the circular outer peripheral weld path 68. The spiral inner weld path 66 may be continuously curved, as shown in FIGS. 4A-4C, may be comprised of straight line segments that together constitute a spiral, as shown in FIGS. 4D-4E, or it may be some combination of the two. When the laser beam 40 is conveyed along the spiral inner weld path 66 illustrated in any of FIGS. 4A-4E, thus forming a trail of re-solidified workpiece material 60 along the inner weld path 66, the heat-affected zone 64 surrounding each revolution of the trail of re-solidified workpiece material 60 overlaps with the heat-affected zone 64 surrounding at least one adjacent revolution of the trail of re-solidified workpiece material 60.

Figure 4F:
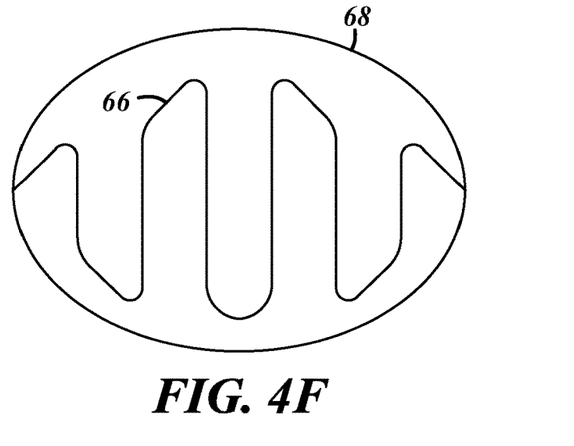

The weld pattern illustrated in FIG. 4F is similar to the weld patterns illustrated in FIGS. 4A-4E in that it comprises a single nonlinear inner weld path 66 surrounded by, and interconnected with, an enclosed outer peripheral weld path 68. Here, however, in FIG. 4F, the weld pattern includes a serpentine inner weld path 66 and an elliptical outer peripheral weld path 68. The serpentine inner weld path 66 extends from one side of the elliptical outer peripheral weld path 68 to the other and is comprised of both curved and straight line segments. And, like before, when the laser beam 40 tracks the serpentine inner weld path 66, thus forming a trail of re-solidified workpiece material 60 along the weld path 66, the heat-affected zone 64 surrounding each vertical portion (vertical in FIG. 4F) of the trail of re-solidified workpiece material 60 overlaps with the heat-affected zone 64 surrounding at least one other adjacent vertical portion of the trail of re-solidified workpiece material 60.

FIGS. 4G-4I and 4K-4M illustrate several embodiments of weld patterns in which the one or more nonlinear inner weld paths 66 are distinct from the enclosed outer peripheral weld path 68. Each of the weld patterns shown in FIGS. 4G-4I and 4K-4M, for example, comprises a plurality of radially-spaced and unconnected circular inner weld paths 66 as well as a circular outer peripheral weld path 68. The circular inner weld paths 66 are concentrically arranged about a central point. These discrete circular weld paths 66 may be radially spaced evenly apart or they may be spaced apart at varying distances. Additionally, as shown, the circular outer peripheral weld path 68 may also be concentrically arranged around a central point along with the circular inner weld paths 66, although such a relationship between the circular inner weld paths 66 and the circular outer peripheral weld path 68 is not mandatory. When the laser beam 40 tracks each of the circular inner weld paths 66 shown in FIGS. 4G-4I and 4K-4M, thus forming a trail of re-solidified workpiece material 60 along each circular inner weld path 66, the heat-affected zone 64 surrounding each circular trail of re-solidified workpiece material 60 overlaps with the heat-affected zone 64 of at least one adjacent circular trail of re-solidified workpiece material 60.

Figures 4G, 4H:
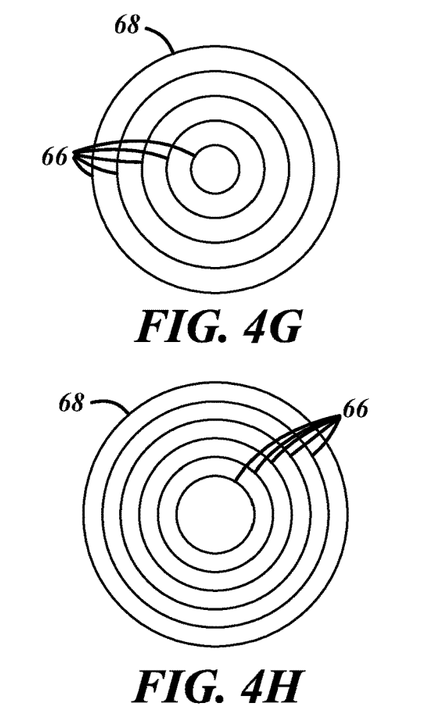
Figure 4I:
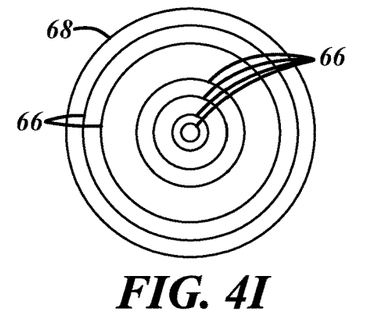
Figure 4J:
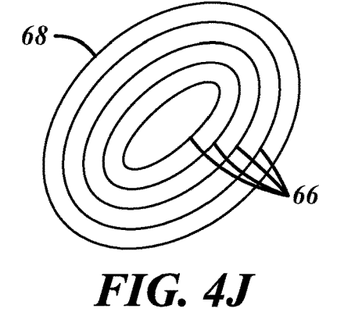
Figures 4K, 4L:
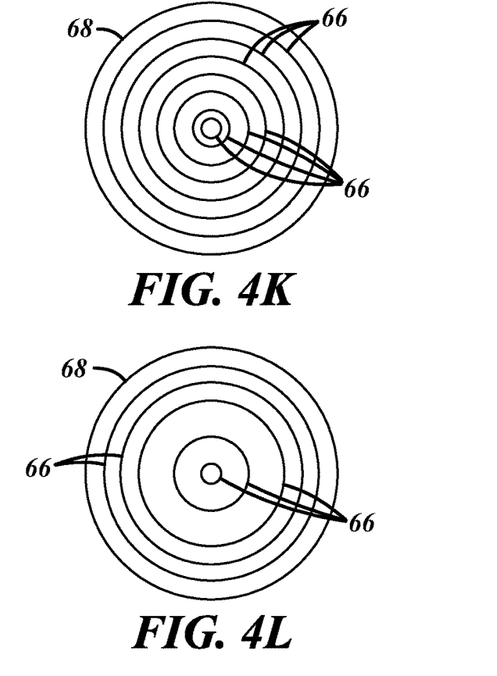
Figure 4M:
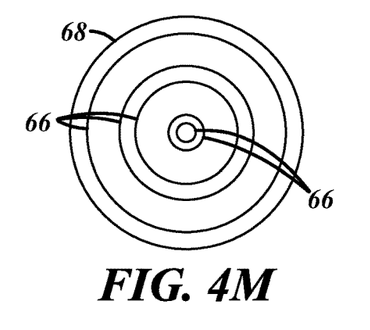
Figure 4N:
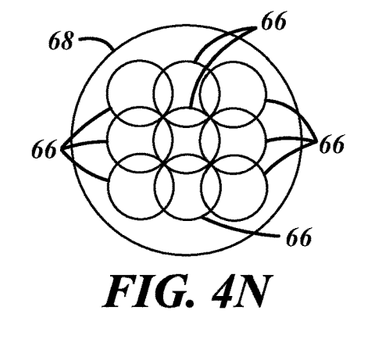

The weld pattern illustrated in FIG. 4J is similar to the weld patterns illustrated in FIGS. 4G-4I and 4K-4M in that it comprises one or more nonlinear inner weld paths 66 that are distinct from the enclosed outer peripheral weld path 68. The weld pattern of FIG. 4J, for instance, comprises a plurality of radially-spaced and unconnected elliptical inner weld paths 66, which may be arranged concentrically around a central point, as well as an elliptical outer peripheral weld path 68. The elliptical inner weld paths 66 may be radially spaced evenly apart or they may be spaced apart by varying distances. The elliptical outer peripheral weld path 68 may also be concentrically arranged around a central point along with the elliptical inner weld paths 66, if desired, although it does not have to be. And, much like before, when the laser beam 40 tracks each of the elliptical inner weld paths 66, thus forming a trail of re-solidified workpiece material 60 along each elliptical inner weld path 66, the heat-affected zone 64 surrounding each elliptical trail of re-solidified workpiece material 60 overlaps with the heat-affected zone 64 of at least one adjacent elliptical trail of re-solidified workpiece material 60.

The weld pattern illustrated in FIG. 4N is similar to the weld patterns illustrated in FIGS. 4G-4M in that it comprises one or more nonlinear inner weld paths 66 that are distinct from the enclosed outer peripheral weld path 68. This weld pattern, however, comprises a plurality of circular inner weld paths 66 in which each of the circular inner weld paths 66 intersects at least one, and preferably at least two, of the other circular inner weld paths 66. In this particular instance, the enclosed outer peripheral weld path 68 is a circular weld path that surrounds the plurality of circular inner weld paths 66. And again, like before, when the laser beam 40 tracks each of the circular inner weld paths 66, thus forming a trail of re-solidified workpiece material 60 along each circular inner weld path 66, the heat-affected zone 64 surrounding each circular trail of re-solidified workpiece material 60 overlaps with the heat-affected zone 64 of at least one other circular trail of re-solidified workpiece material 60. Indeed, in this embodiment, the trail of re-solidified workpiece material 60 associated with each of the circular inner weld paths 66 actually intersects with the trail of re-solidified workpiece material 60 associated with at least two other circular inner weld paths 66.

Figure 5:
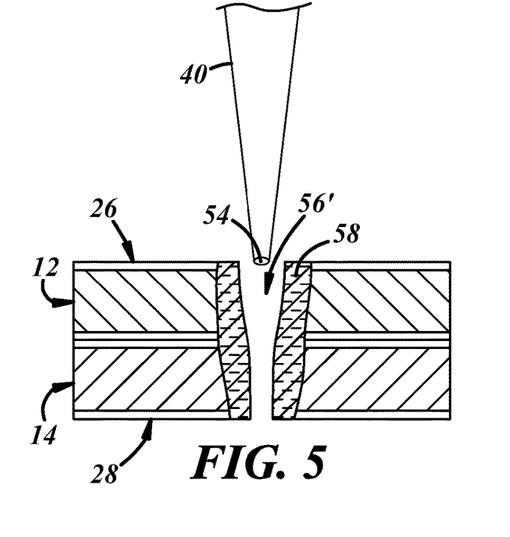
FIG. 5 is a cross-sectional view of a fully-penetrating keyhole and the workpiece stack-up as illustrated in FIG. 2, taken along line 5-5.
Figure 6:
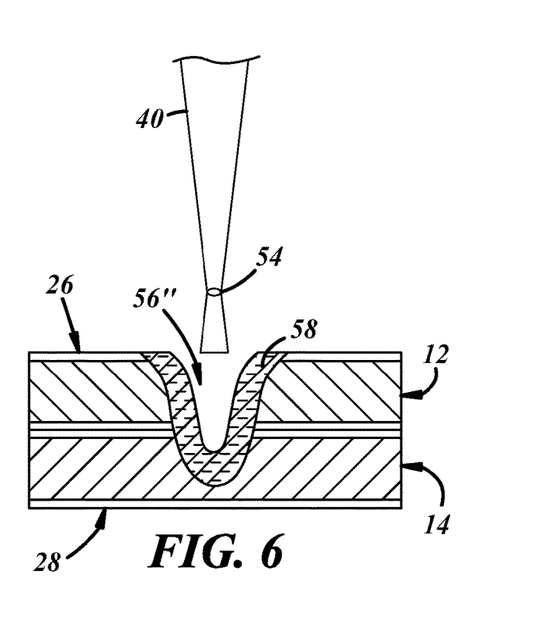
FIG. 6 is a cross-sectional view of a partially penetrating keyhole formed in a workpiece stack-up by a defocused laser beam, taken from the same vantage point as FIG. 5.

Referring now to FIGS. 5-6, the penetration of the keyhole 56 is controlled as the laser beam 40 is conveyed along the predetermined weld pattern. Specifically, as shown in FIG. 5, a keyhole 56' that fully penetrates the workpiece stack-up 10—meaning that the keyhole 56 extends from the top surface 26 of the workpiece stack-up 10 (also surface 18 in this embodiment) through the bottom surface 28 of the workpiece stack-up 10 (also surface 22 in this embodiment)—is maintained as the laser beam 40 is conveyed along the one or more nonlinear inner weld paths 66. On the other hand, as shown in FIG. 6, a keyhole 56" that partially penetrates the workpiece stack-up 10—meaning that the keyhole 56 extends into the stack-up 10 from the top surface 26 of the workpiece stack-up 10 but does not reach the bottom surface 28 of the workpiece stack-up 10—is maintained as the laser beam 40 is conveyed along the enclosed outer peripheral weld path 68. When the partially-penetrating keyhole 56" is conveyed along the enclosed outer peripheral weld path 68, the keyhole 56" does not necessarily have to penetrate far enough into the stack-up 10 that it traverses the faying interface 30 in the manner depicted in FIG. 6. Indeed, the partially-penetrating keyhole 56" may extend only part way from the top surface 26 of the workpiece stack-up 10 to the faying interface 30, thus penetrating into the first steel workpiece 12 but not the second steel workpiece 14, during at least some or even all of the time that the laser beam 40 is tracking the enclosed outer peripheral weld path 68.

The different levels of keyhole penetration attained during conveyance of the laser beam 40 along (1) the one or more nonlinear inner weld paths 66 and (2) the enclosed outer peripheral weld path 68 contribute different yet complimentary structural attributes to the final weld joint 50. The conveyance of the laser beam 40 and the fully-penetrating keyhole 56' along the one or more nonlinear inner weld paths 66 forms the trail of re-solidified workpiece material 60 along the weld path(s) 66 such that the re-solidified workpiece material traverses the faying interface 30 and fusion welds the steel workpieces 12, 14 together. The fully-penetrating keyhole 56' also provides a conduit through which zinc vapors can be vented away from the faying interface 30 so that, despite the faying interface 30 being a zero-gap interface, the trail(s) of re-solidified workpiece material 60 formed along the nonlinear inner weld path(s) 66 does not contain sufficient weld defects attributed to zinc vapor diffusion and entrapment within the molten steel weld pool 58. Moreover, in addition to the fully-penetrating keyhole 56', the overlapping heat-affected zones 64 derived from the contour and spacing of the one or more nonlinear inner weld paths 66 are believed to further reduce the potential adverse effects of the zinc layers 36 present at the zero-gap faying interface 32.

Without being bound by theory, the heat from the laser beam 40 that produces the heat-affected zone 64 around each trail of re-solidified workpiece material 60 is believed to remove some or all of the vaporizable zinc included on the first and second steel workpieces 12, 14 within the heat-affected zone(s) 64. Removal of the vaporizable zinc can occur through vaporization, heat-assisted reaction, or some other neutralizing mechanism. Thus, as the laser beam 40 progresses along the one or more nonlinear inner weld paths 66, the heat input from the laser beam 40 emanates away from the fully-penetrating keyhole 56' and the surrounding molten steel weld pool 58 and into at least part of a previously-created heat-affected zone 64 where vaporizable zinc is not as abundant compared to areas outside of the heat-affected zone 64. This localized reduction in readily-vaporizable zinc is thought to make it easier for the fully-penetrating keyhole 56' to vent enough zinc vapors away from the faying interface 30 that weld defects, such as porosity and spatter, are not contained within the trail(s) of re-solidified workpiece material 60 to an unacceptable extent.

For example, referring specifically to FIG. 4G, assume that the laser beam 40 progresses from the innermost circular inner weld path 66 to the outermost circular inner weld path 66 when tracking the weld pattern. The laser beam 40 is thus conveyed along the innermost circular inner weld path 66 first to create a corresponding circular trail of re-solidified workpiece material 60 and a surrounding heat-affected zone 64. Next, the laser beam 40 is conveyed along the next circular inner weld path 66 immediately surrounding the innermost circular inner weld path 66. When this occurs, the heat input from the laser beam 40 is pushed along and through part of the heat-affected zone 64 that surrounds the trail of re-solidified workpiece material 60 associated with the innermost circular inner weld path 66, which later results in overlapping heat-affected zones 64 as depicted generally in FIGS. 3-3A. The same interaction of heat input from the laser beam 40 and previously-formed heat-affected zones 64 continues until the laser beam 40 has tracked the outermost and last circular inner weld path 66. In the end, after the laser beam 40 has been conveyed along all of the circular inner weld paths 66, the several resultant circular trails of re-solidified workpiece material 60 will have minimal, if any, weld defects derived from zinc vapors due to the lessened amounts of vaporizable zinc present in the heat-affected zones 64 that are encroached upon by the heat input of the advancing laser beam 40.

The conveyance of the laser beam 40 and the partially-penetrating keyhole 56" along the enclosed outer peripheral weld path 68 serves a different purpose. While it is acceptable for the partially-penetrating keyhole 56" to traverse the faying interface 30 for some or all of the time the laser beam 40 is tracking the outer peripheral weld path 68, thus creating a trail of re-solidified workpiece material 60 that fusion welds the first and second steel workpieces 12, 14 together with minimal weld defects, that is not its only objective. Rather, the partially-penetrating keyhole 56" is conveyed along the enclosed outer peripheral weld path 68 so that the shallower partially-penetrating keyhole 56" and the wider molten steel weld pool 58 surrounding the keyhole 56' (compared to the fully-penetrating keyhole 56') can create a smoother transition on the top surface 26 of the workpiece stack-up 10 between the laser weld joint 50 and the adjacent surrounding portions of the stack-up 10 outside of the laser weld joint 50. The creation of a smoother transition avoids the formation of a sharp crest around the boundary of the laser weld joint 50 at the top surface 26 of the workpiece stack-up 10. The avoidance of a sharp crest is preferable here since it can be easily stressed and thus weaken the joint 50, promote burn-through, and adversely affect the visible appearance of the weld joint 50.

The depth of penetration of the keyhole 56 can be controlled by various laser welding process parameters including the power level of the laser beam 40, the position of the focal point 54 of the laser beam 40 relative to the top surface 26 of the workpiece stack-up 10 (i.e., focal position), and the travel velocity of the laser beam 40 relative to the workpiece stack-up 10. In general, the penetration of the keyhole 56 can be increased by increasing the power level of the laser beam 40, focusing the laser beam 40 by moving the focal point 54 towards the top surface 26 of the workpiece stack-up 10 (along the −Z direction denoted FIG. 1), decreasing the travel velocity of the laser beam 40, or a combination thereof. Conversely, the penetration of the keyhole 56 can be decreased by decreasing the power level of the laser beam 40, defocusing the laser beam 40 by moving the focal point 54 away from the top surface 26 of the workpiece stack-up 10 to increase the distance between the focal point 54 and the top surface 26, increasing the travel velocity of the laser beam 40, or a combination thereof. Through these process parameters and the many ways they can be adjusted, the keyhole 56 can be readily transitioned between the fully-penetrating 56' and the partially-penetrating 56", and vice versa, as the laser beam 40 is conveyed along the weld pattern.

In a preferred embodiment, to create and maintain the fully-penetrating keyhole 56', the focal position of the laser beam 40 is set so that the focal point 54 is located at the top surface 26 of the workpiece stack-up 10. The focal distance in this case is zero. The term "focal distance" as used herein refers to the distance between the focal point 54 and the top surface 26 of the workpiece stack-up 10 with distances below the top surface 26 being negative distances (i.e., focal distance <0) and distances above the top surface 26 being positive distances (i.e., focal distance >0). When, however, the partially-penetrating keyhole 56" is desired, the focal position of the laser beam 40 is preferably set so that the focal point 54 is positioned above the top surface 26 of the workpiece stack-up 10, resulting in a positive focal distance. A focal distance that may be employed to support the partially-penetrating keyhole 56" typically lies anywhere between 10 mm and 30 mm above the top surface 26 of the workpiece stack-up 10.

In each case, whether the keyhole 56 fully or partially penetrates the workpiece stack-up 10, the power level and travel velocity of the laser beam 40 can be chosen to complement the focal position of the laser beam 40 in order achieve a stable keyhole 56 at the desired penetration depth. While the exact power level and travel velocity employed depend on a variety of factors, including the thicknesses and steel compositions of the first and second steel workpieces 12, 14, the power level and travel velocity of the laser beam 40 often range from 2.25 kW to 2.95 kW and 3.5 m/min to 6.0 m/min, respectively, when the focal distance of the laser beam 40 is zero and the fully-penetrating keyhole 56' is desired. When, on the other hand, the focal distance of the laser beam 40 is greater than zero, such as between 10 mm to 30 mm, and the partially-penetrating keyhole 56" is desired, the power level and travel velocity of the laser beam 40 often range from 2.35 kW to 3.05 kW and 4.0 m/min to 6.5 m/min, respectively.

Figure 7:
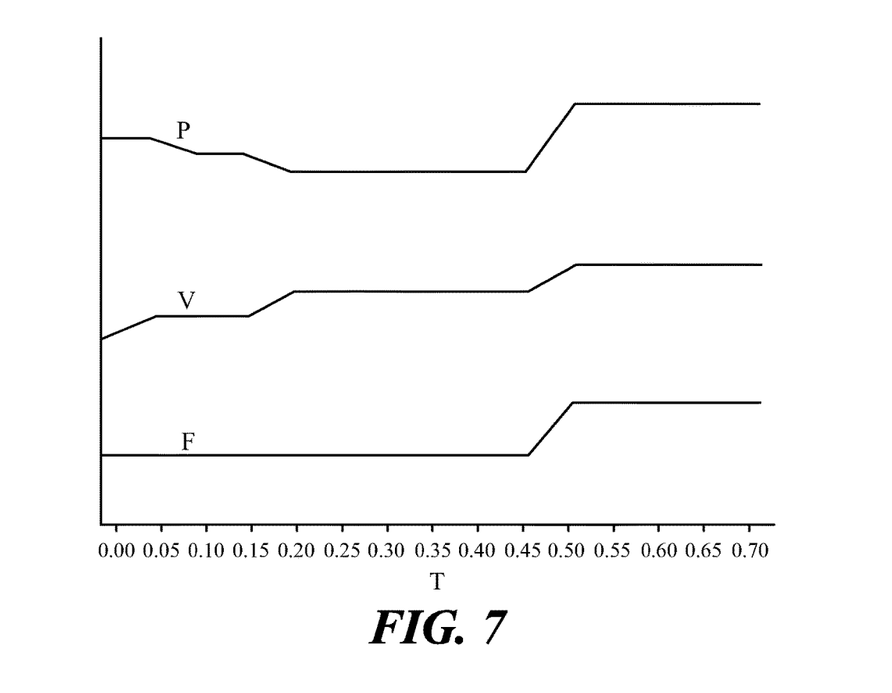
FIG. 7 is a graphical illustration of laser power level (P), travel velocity (V), and focal position (F) of a laser beam, all plotted against time in seconds (T), during the formation of a laser weld joint according to one or more embodiments of the present disclosure.

FIG. 7 illustrates a representative example of how the power level (P), travel velocity (V), and focal position (F) of the laser beam 40 can be adjusted as the laser beam 40 is conveyed along the one or more nonlinear inner weld paths 66 and the enclosed outer peripheral weld path 68 of a weld pattern configured according to the present disclosure. In this example, the one or more nonlinear inner weld paths 66 constitute a spiral inner weld path and the enclosed outer peripheral weld path 68 constitutes a circular outer peripheral weld path that surrounds and is interconnected with the spiral inner weld path. The laser beam 40 is conveyed along the spiral inner weld path between T=0.00 seconds and T=0.45 seconds using a fully-penetrating keyhole 56', and is then conveyed along the circular outer peripheral weld path between T=0.45 seconds and T=0.72 seconds using a partially-penetrating keyhole 56".

To begin, at T=0.00 seconds, the laser beam 40 is directed at a fixed interior point on the top surface 26 of the workpiece stack-up 10. A fully-penetrating keyhole 56' is created at the fixed interior point by setting the power level P and the focal position F of the laser beam 40 in order to achieve the requisite power density needed to initiate and support the fully-penetrating keyhole 56'. The power level P of the laser beam 40 is set, for the most part, depending on the reflectivity of the top surface 26 of the workpiece stack-up 10 as well as the specific thicknesses and steel compositions of the first and second steel workpieces 12, 14. The focal position F is set so that the focal point 54 of the laser beam 40 is located at the top surface 26 in order to concentrate the power delivered by the laser beam 40 deep into the workpiece stack-up 10. When the focal point 54 of the laser beam 40 is so positioned, the focal distance between the top surface 26 of the workpiece stack-up 10 and the focal point 54 is zero.

Once the fully-penetrating keyhole 56' is formed and stable, the laser beam 40 is conveyed along the spiral inner weld path. And, in fact, as shown generally in FIG. 7 (between T=0.05 seconds and T=0.20 seconds), the power level P of the laser beam 40 is decreased incrementally and the travel velocity V of the laser beam 40 is increased incrementally once the fully-penetrating keyhole 56' is formed and moving since less power density is required to maintain the keyhole 56' than is required to create it. The power level P is reduced and the travel velocity V is increased at T=0.20 seconds to values that remain consistent up to T=0.45 seconds. The convergence of the power level P and the travel velocity V to their constant values is done for several reasons: (1) to help suppress spatter and to ensure that the laser beam 40 does not overheat the first and second steel workpieces 12, 14 during the remote laser welding process and permanently melt away any portion of the steel workpieces 12, 14; and (2) to convey the laser beam 40 at a travel velocity that is able to efficiently and effectively vent zinc vapors produced at the zero-gap faying interface 30 through the keyhole 56.

Eventually, the laser beam 40 finishes tracking the spiral inner weld path and transitions to tracking the circular outer peripheral weld path. The transition to the circular outer peripheral weld path happens in FIG. 7 at T=0.45 seconds. At this time, between T=0.45 seconds and T=0.50 seconds, the fully-penetrating keyhole 56' is modified into a partially-penetrating keyhole 56", and the latter is conveyed along the circular outer peripheral weld path. Here, in this example, to bring about the partially-penetrating keyhole 56", the laser beam 40 is defocused such that the focal point 54 is re-positioned from the top surface 26 of the workpiece stack-up 10 (focal distance=0) to a distance above the top surface 26 of the workpiece stack-up 10 (focal distance >0). Defocusing the laser beam 40 in this way spreads the power delivered by the laser beam 40 over a broader area which, in turn, reduces the power density of the laser beam 40 and thereby decreases keyhole penetration depth. The power level P and travel velocity V of the laser beam 40 may also be increased at the same time the laser beam 40 is defocused to help support and maintain the partially-penetrating keyhole 56″ as well as speed up the conveyance of the laser beam 40.

It should be noted that the order in which the laser beam 40 is conveyed along the one or more nonlinear inner weld paths 66 and the enclosed outer peripheral weld path 68 may vary. The laser beam 40 may, for example, be conveyed first along the one or more nonlinear inner weld paths 66 and then along the outer peripheral weld path 68. In another example, however, the laser beam 40 may be conveyed first along the outer peripheral weld path 68 and then along the one or more nonlinear inner weld paths 66. Additionally, in embodiments where the weld pattern includes a plurality of nonlinear inner weld paths 66, the laser beam 40 may be conveyed along the inner weld paths 66 in any order including from the innermost inner weld path 66 to the outermost inner weld path 66, from the outermost inner weld path 66 to the innermost inner weld path 66, or in some other order. Still further, in other embodiments, the laser beam 40 may be conveyed along some of the one or more nonlinear inner weld paths 66, then may be conveyed along the enclosed outer peripheral weld path 68, and finally may be conveyed along the rest of the one or more nonlinear inner weld paths 66 to complete the weld pattern.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of remote laser welding a workpiece stack-up that includes at least two overlapping steel workpieces, the method comprising:
   providing a workpiece stack-up that includes two or three overlapping steel workpieces, the workpiece stack-up comprising a first steel workpiece that provides a top surface of the stack-up and a second steel workpiece that provides a bottom surface of the stack-up, wherein every faying interface in the workpiece stack-up between the top and bottom surfaces provided by the first and second steel workpieces is a zero-gap interface, and wherein at least one of the two or three steel workpieces in the workpiece stack-up is a zinc-coated steel workpiece;
   directing a laser beam at the top surface of the workpiece stack-up to form a keyhole that extends into the workpiece stack-up from the top surface of the workpiece stack-up, the keyhole being surrounded by a molten steel weld pool; and
   conveying the laser beam relative to the top surface of the workpiece stack-up along a predefined weld pattern that includes one or more nonlinear inner weld paths and an enclosed outer peripheral weld path that surrounds the one or more nonlinear inner weld paths, the keyhole fully penetrating the workpiece stack-up when being conveyed along the one or more nonlinear inner weld paths and partially-penetrating the workpiece stack-up when being conveyed along the enclosed outer peripheral weld path, the conveyance of the laser beam and the keyhole along the one or more nonlinear inner weld paths leaving behind a trail of re-solidified workpiece material along each of the one or more nonlinear inner weld paths that fusion welds the two or three steel workpieces together.

2. The method set forth in claim 1, wherein the trail of re-solidified workpiece material formed along each of the one or more nonlinear inner weld paths is surrounded within the workpiece stack-up by a heat-affected zone, and wherein the one or more nonlinear inner weld paths are spaced and contoured so that the heat-affected zone that surrounds the trail of re-solidified workpiece material formed along each nonlinear inner weld path overlaps with the heat-affected zone of the trail of re-solidified workpiece material formed along at least one other nonlinear inner weld path or at least one adjacent portion of the same nonlinear inner weld path.

3. The method set forth in claim 1, wherein the first steel workpiece has an outer surface and a first faying surface, and the second steel workpiece has an outer surface and a second faying surface, the outer surface of the first steel workpiece providing the top surface of the workpiece stack-up and the outer surface of the second steel workpiece providing the bottom surface of the workpiece stack-up, and wherein the first and second faying surfaces of the first and second steel workpieces overlap and abut each other to establish a zero-gap faying interface, at least one of the first or second steel workpieces being a zinc-coated steel workpiece.

4. The method set forth in claim 1, wherein the first steel workpiece has an outer surface and a first faying surface, and the second steel workpiece has an outer surface and a second faying surface, the outer surface of the first steel workpiece providing the top surface of the workpiece stack-up and the outer surface of the second steel workpiece providing the bottom surface of the workpiece stack-up, and wherein the workpiece stack-up comprises a third steel workpiece situated between the first and second steel workpieces, the third steel workpiece having opposed faying surfaces, one of which overlaps and abuts the first faying surface of the first steel workpiece to establish a zero-gap faying interface and the other of which abuts the second faying surface of the second steel workpiece to establish another zero-gap faying interface.

5. The method set forth in claim 1, wherein each of the steel workpieces in the workpiece stack-up is a zinc-coated steel workpiece.

6. The method set forth in claim 1, wherein the one or more nonlinear inner weld paths comprises a plurality of radially-spaced and unconnected circular or elliptical weld paths.

7. The method set forth in claim 1, wherein the one or more nonlinear inner weld paths comprises a spiral weld path that revolves around and expands radially outwardly from a fixed interior point.

8. The method set forth in claim 1, wherein the enclosed outer peripheral weld path is interconnected to the one or more nonlinear inner weld paths.

9. The method set forth in claim 1, further comprising:
   positioning a focal point of the laser beam at or below the top surface of the workpiece stack-up when the laser beam is being conveyed along the one or more nonlinear inner weld paths such that the keyhole penetrates fully through the workpiece stack-up from the top surface of the workpiece stack-up through the bottom surface of the workpiece stack-up; and
   positioning the focal point of the laser beam a distance above the top surface of the workpiece stack-up when the laser beam is being conveyed along the enclosed outer peripheral weld path such that the keyhole penetrates partially through the workpiece stack-up from the top surface of the workpiece stack-up but does not reach the bottom surface of the workpiece stack-up.

10. The method set forth in claim 9, wherein the laser beam is conveyed first along one or more nonlinear weld paths and then along the enclosed outer peripheral weld path, the method further comprising:
defocusing the laser beam after the laser beam is conveyed along the one or more nonlinear inner weld paths to position the focal point of the laser beam a distance above the top surface of the workpiece stack-up to modify the keyhole from fully penetrating the workpiece stack-up to partially penetrating the workpiece stack-up.

11. The method set forth in claim 10, further comprising:
increasing a power level of the laser beam when the laser beam is being conveyed along the enclosed outer peripheral weld path and the focal point of the laser beam is positioned a distance above the top surface of the workpiece stack-up; and
increasing a travel velocity of the laser beam relative to the top surface of the workpiece stack-up when the laser beam is being conveyed along the enclosed outer peripheral weld path and the focal point of the laser beam is positioned a distance above the top surface of the workpiece stack-up;
wherein the power level of the laser beam and the travel velocity of the laser beam during conveyance of the laser beam along the enclosed outer peripheral weld path are increased relative to a power level of the laser beam and a travel velocity of the laser beam during conveyance of the laser beam along the one or more nonlinear inner weld paths.

12. A method of remote laser welding a workpiece stack-up that includes at least two overlapping steel workpieces, the method comprising:
providing a workpiece stack-up that includes two or three overlapping steel workpieces, the workpiece stack-up comprising a first steel workpiece that provides a top surface of the stack-up and a second steel workpiece that provides a bottom surface of the stack-up, wherein every faying interface in the workpiece stack-up between the top and bottom surfaces provided by the first and second steel workpieces is a zero-gap interface, and wherein at least one of the two or three steel workpieces in the workpiece stack-up is a zinc-coated steel workpiece;
directing a laser beam at the top surface of the workpiece stack-up to form a keyhole that extends into the workpiece stack-up from the top surface of the workpiece stack-up, the keyhole being surrounded by a molten steel weld pool; and
conveying the laser beam relative to the top surface of the workpiece stack-up along a predefined weld pattern that includes one or more nonlinear inner weld paths and an enclosed outer peripheral weld path that surrounds the one or more nonlinear inner weld paths, the keyhole fully penetrating the workpiece stack-up when being conveyed along the one or more nonlinear inner weld paths, the conveyance of the laser beam and the fully-penetrating keyhole along the one or more nonlinear inner weld paths leaving behind a trail of re-solidified workpiece material along each of the one or more nonlinear inner weld paths that fusion welds the two or three steel workpieces together, and wherein the trail of re-solidified workpiece material formed along each of the one or more nonlinear inner weld paths is surrounded within the workpiece stack-up by a heat-affected zone that overlaps with the heat-affected zone of the trail of re-solidified workpiece material formed along at least one other nonlinear inner weld path or at least one adjacent portion of the same nonlinear inner weld path.

13. The method set forth in claim 12, wherein, during conveyance of the laser beam along the enclosed outer peripheral weld path, the keyhole partially penetrates the workpiece stack-up such that the keyhole extends into the stack-up from the top surface of workpiece stack-up but does not reach the bottom surface of the workpiece stack-up.

14. The method set forth in claim 13, further comprising:
positioning a focal point of the laser beam at or below the top surface of the workpiece stack-up when the laser beam is being conveyed along the one or more nonlinear inner weld paths such that the keyhole penetrates fully through the workpiece stack-up from the top surface of the workpiece stack-up through the bottom surface of the workpiece stack-up; and
positioning the focal point of the laser beam a distance above the top surface of the workpiece stack-up when the laser beam is being conveyed along the enclosed outer peripheral weld path such that the keyhole penetrates partially through the workpiece stack-up from the top surface of the workpiece stack-up but does not reach the bottom surface of the workpiece stack-up.

15. The method set forth in claim 13, wherein the laser beam has a power level and a travel velocity relative to the top surface of the workpiece stack-up, and wherein the power level and travel velocity of the laser beam are greater when the laser beam is conveyed along the enclosed outer peripheral weld path than when the laser beam is conveyed along the one or more nonlinear inner weld paths.

16. The method set forth in claim 12, wherein the workpiece stack-up includes only the first and second steel workpieces such that a single zero-gap faying interface is established within the workpiece stack-up between the first and second steel workpieces, or wherein the workpiece stack-up includes an additional third steel workpiece situated between the first and second steel workpieces such that a zero-gap faying interface is established within the workpiece stack-up between both the first and third steel workpieces and between the second and third steel workpieces.

17. The method set forth in claim 12, wherein the one or more nonlinear inner weld paths comprises a plurality of radially-spaced and unconnected circular or elliptical weld paths.

18. The method set forth in claim 12, wherein the one or more nonlinear inner weld paths comprises a spiral weld path that revolves around and expands radially outwardly from a fixed interior point.

19. A method of remote laser welding a workpiece stack-up that includes at least two overlapping steel workpieces, the method comprising:
providing a workpiece stack-up that includes two or three overlapping steel workpieces, the workpiece stack-up comprising a first steel workpiece that provides a top surface of the stack-up and a second steel workpiece that provides a bottom surface of the stack-up, wherein every faying interface in the workpiece stack-up between the top and bottom surfaces provided by the first and second steel workpieces is a zero-gap interface, and wherein at least one of the two or three steel workpieces in the workpiece stack-up is a zinc-coated steel workpiece;
directing a laser beam at the top surface of the workpiece stack-up to form a keyhole that extends into the workpiece stack-up from the top surface of the workpiece stack-up, the keyhole being surrounded by a molten steel weld pool;

penetrating the keyhole fully through the workpiece stack-up, such that the keyhole extends from the top surface of the workpiece stack-up through the bottom surface of the workpieces stack-up, and conveying the laser beam and the keyhole relative to the top surface of the workpiece stack-up along one or more nonlinear inner weld paths while the keyhole is fully penetrating the workpiece stack-up; and penetrating the keyhole partially through the workpiece stack-up, such that the keyhole extends from the top surface of the workpiece stack-up but does not reach the bottom surface of the workpiece stack-up, and conveying the laser beam and the keyhole relative to the top surface of the workpiece stack-up along an enclosed outer peripheral weld path that surrounds the one or more nonlinear inner weld paths while the keyhole is partially penetrating the workpiece stack-up.

20. The method set forth in claim 19, wherein conveying of the laser beam and keyhole along the one or more nonlinear inner weld paths leaves behind a trail of re-solidified workpiece material along each of the one or more nonlinear inner weld paths that fusion welds the two or three steel workpieces together, the trail of re-solidified workpiece material formed along each of the one or more nonlinear inner weld paths being surrounded within the workpiece stack-up by a heat-affected zone that overlaps with the heat-affected zone of the trail of re-solidified workpiece material formed along at least one other nonlinear inner weld path or least one adjacent portion of the same nonlinear inner weld path.

* * * * *